United States Patent [19]

Vaselich et al.

[11] 4,229,659

[45] Oct. 21, 1980

[54] OXIDIZER BURN THROUGH DETECTOR WITH MAJORITY VOTING NETWORK

[75] Inventors: Raymond A. Vaselich; John Dixon, Jr., both of Fredericksburg, Va.

[73] Assignee: The United States of America as represented by the Secretary of the Navy, Washington, D.C.

[21] Appl. No.: 961,807

[22] Filed: Nov. 17, 1978

[51] Int. Cl.[3] .............. G02B 27/00

[52] U.S. Cl. .............. 250/554; 250/226

[58] Field of Search .............. 250/554, 226; 340/578; 356/315

[56] References Cited

U.S. PATENT DOCUMENTS

| | | | |
|---|---|---|---|
| 3,210,552 | 10/1965 | Young | 250/226 |
| 3,274,580 | 9/1966 | Thomson | 340/578 |
| 3,958,126 | 5/1976 | Bryant | 250/554 |

*Primary Examiner*—David C. Nelms

*Assistant Examiner*—Darwin R. Hostetter

[57] ABSTRACT

A system for detecting oxidizer burn through comprising a network of three independent photodetectors and their associated circuitry connected to a two-out-of-three majority voting network. When a fire occurs, the photodiodes will produce a response. If two or three signals are received by the voting network, an output signal is produced which can be used to dump oxidizer, activate alarms, close valves, activate damage control systems, etc. Two types of detection techniques are possible: (1) spectral line detection which incorporates an optical pass filter before each photodetector which limits the detector so that it responds only to a wavelength of light produced by a particular burning metal-oxidizer combination, and (2) intensity change detection which incorporates comparison circuitry after the photodetectors which compares detected light levels to ambient light levels.

7 Claims, 2 Drawing Figures

OXIDIZER BURN THROUGH DETECTOR WITH MAJORITY VOTING NETWORK

BACKGROUND OF THE INVENTION

Chemical lasers have been made to lase at a particular wavelength. For example, a deuterium flouride laser will lase at 3.8 microns if the energy level of the deuterium fluoride is sufficiently high. This result is obtained by reacting deuterium with atomic fluorine. The atomic fluorine is produced by introducing fluorine, or a fluorine containing compound such as nitrogen trifluoride, into a first chamber containing a small quantity of a fuel such as acetylene. The fuel is rapidly oxidized to produce hydrogen fluoride plus atomic fluorine. These materials then pass through a supersonic nozzle, where an energy inversion takes place, and into a second chamber where they are mixed with deuterium and helium. The atomic flourine reacts with the deuterium to produce deuterium fluoride which lases at 3.8 microns.

One large problem in the operation of deuterium fluoride lasers is the difficulty in handling fluorine or fluorine containing compounds. Since fluorine will oxidize virtually anything, the problems of handling it can be appreciated. One workable system is made entirely of nickel. This system is first prepared for handling fluorine by the introduction into the system of a small quantity of fluorine at low pressure. The fluorine combines with the nickel to produce a thin coating of nickel fluoride on all the interior surfaces of the system. This coating is tough and is resistant to further oxidation by the fluorine as long as the system remains uncontaminated by any materials which can serve as a fuel for the fluorine. Should any contaminant be present in the system, the oxidation of the contaminant by the fluorine in the system will produce sufficient heat to burn away the nickel fluorine coating and enable the fluorine to begin burning through the nickel wall. If such an accident occurs, the burn through must be rapidly detected in order that safety measures may be taken.

One standard technique for oxidizer burn through detection has been the use of "fleak" wires. With the "fleak" wire technique, insulated wires are permanently wrapped around the oxidizer system piping. Continuity of the wires is interrupted when a burn through occurs because first the insulation and then the wires burn. The interruption in continuity is used to dump oxidizer, activate alarms, close valves, or activate damage control systems. There are various problems associated with the use of the "fleak" wire technique. For example, maintenance of the oxidizer piping system is complicated due to the presence of the "fleak" wires and the possibility exists of false alarms if the wires are broken during system maintenance. Also, nonburning oxidizer leak, e.g., a leak through a joint in the piping system, could cause the "fleak" wire insulation to ignite and this heat source could then cause the oxidizer system materials to ignite resulting in escalation of a minor burn into a major fire. Additionally, "fleak" wires cannot detect burn propagating up valve stems because "fleak" wires cannot be wrapped on moving parts. Further, joints in the piping system are also difficult to wrap to obtain 100% coverage.

SUMMARY OF THE INVENTION

The aforementioned difficulties are obviated by the present invention which employs a plurality of independent photodetectors and their associated circuitry connected to a majority voting network. The photodetectors will produce a signal in response to a burn through and when the majority voting network receives a signal from the majority of the photodetectors, an output signal is produced which can be used to initiate various safety measures. The photodetectors can be provided with pass filters, which pass particular wavelengths of light, or they can be connected to comparison circuitry which detects changes in the ambient light levels to produce signals which are applied to the majority voting network.

STATEMENT OF THE OBJECTS OF THE INVENTION

It is a primary object of this invention to provide a new and improved oxidizer burn through detection system.

It is another object of the present invention to provide an oxidizer burn through detector which will facilitate maintenance of an oxidizer piping system.

It is a further object of this invention to provide an oxidizer burn through detection system which is not destroyed, in whole or in part, by a burn through.

It is yet another object of this invention to provide an oxidizer burn through detector with increased speed of response.

It is yet a further object of this invention to provide an oxidizer burn through detector incorporating redundant elements to provide increased reliability.

BRIEF DESCRIPTION OF THE DRAWINGS

Other object, advantages and novel features of the present invention will become readily apparent upon consideration of the following detailed description when read in conjunction with the accompanying drawings wherein.

DESCRIPTION OF THE PREFERRED EMBODIMENTS

Figure 1:
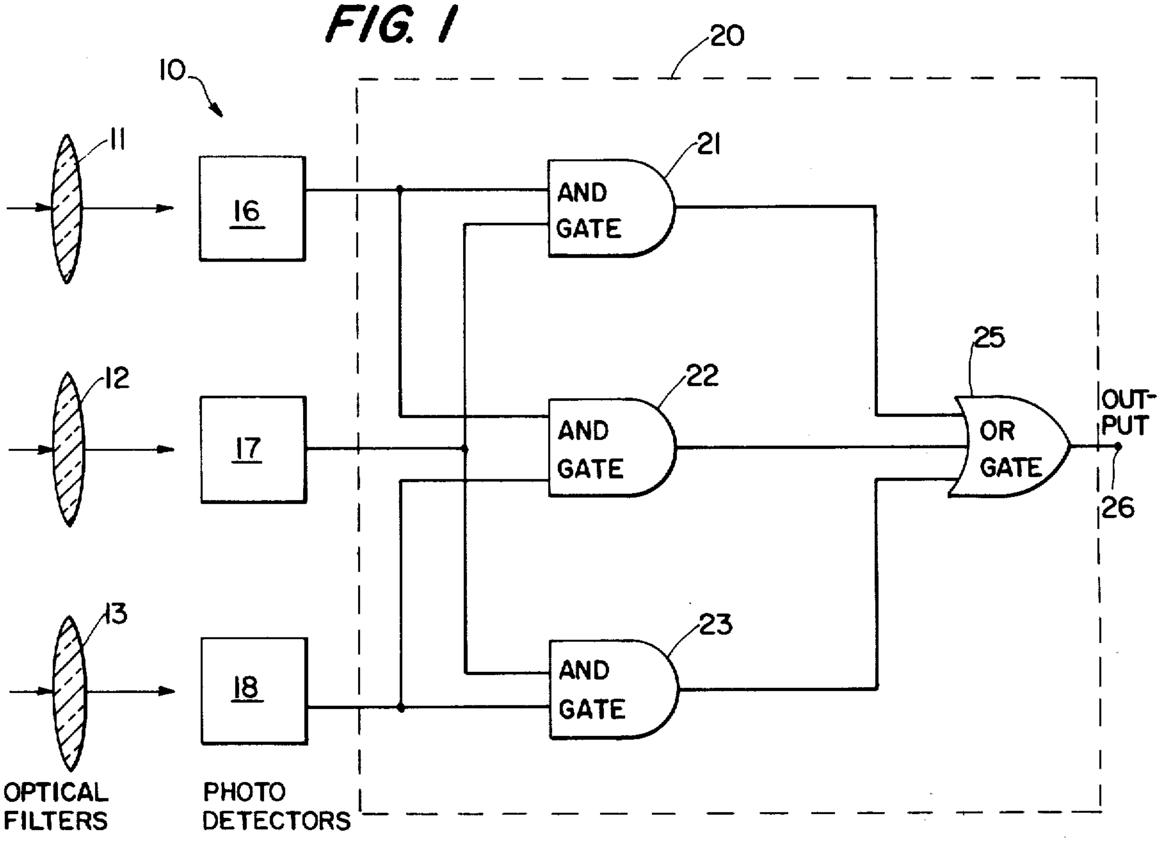
FIG. 1 is a block diagram of a spectral line detection system.

Attention now is directed to FIG. 1 of the drawings wherein there is illustrated a spectral line detection system designated generally by the reference numeral 10. The system 10 includes three optical pass filters 11, 12 and 13 which will pass only a wavelength of light which is produced by a particular burning metal-oxidizer combination, e.g., nickel and fluorine. Photodetectors 16, 17 and 18 are optically associated with filters 11 to 13 and are designed to produce an output only when the filters 11 to 13 pass light of the particular wavelength. The photodetectors and filters will be placed near but separated from the oxidizer system (not shown) so that fires may be detected without the risk of damage to the detector system. The photodetectors 16 to 18 are electrically connected to a majority voting network 20. The network 20 comprises and AND gates 21, 22 and 23 and an OR gate 25. The photodetectors 16 to 18 are each connected to a different pair of AND gates so that it is necessary for at least 2 of the photodetectors to sense a fire before any one of the AND gates will fire. This wiring arrangement provides the majority voting feature of the network 20 which helps to preclude inadvertant operations due to spurious signals or other causes. Firing of any of the AND gates 21 to 23 turns on the OR gate 26 and produces an output signal at terminal 26 which may be used to dump oxidizer, activate alarms, close valves, activate damage control systems, etc. The associated power circuitry for detection system 10 has been omitted for FIG. 1 for purposes of simplicity.

Figure 2:
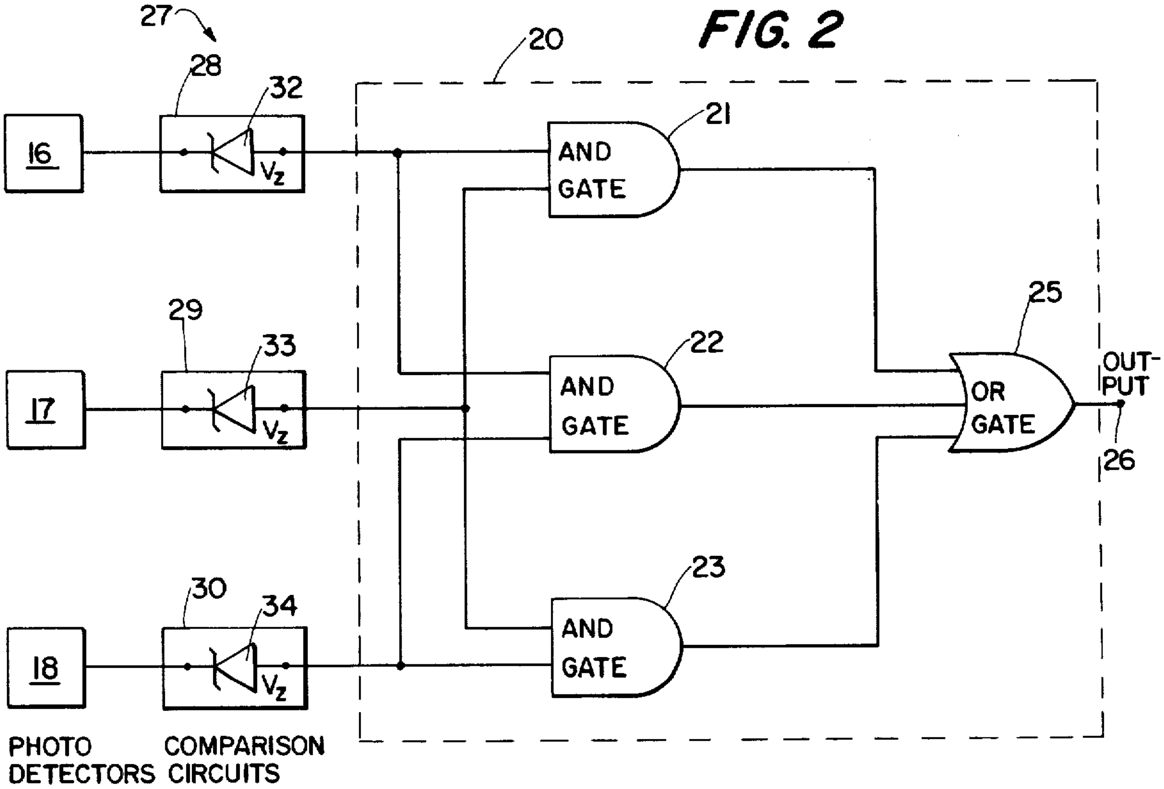
FIG. 2 is a block diagram of an intensity change detection system.

Referring now to FIG. 2 there can be seen an intensity change detection system designated generally by the reference numeral 27. The system 27 employs the photodetectors 16 to 18 and the majority voting network 20 of the detection system illustrated in FIG. 1. However, instead of optical pass filters 11 to 13, the system 27 employs comparison/blocking circuits 28, 29 and 30. Each of the comparison circuits 28 to 30 includes, inter alia, a zener diode 32, 33 and 34, respectively. The zener diodes 32 to 34 in the comparison circuits 28 to 30 only conduct when a voltage greater than $V_z$ is seen. The voltage, $V_z$, is predetermined by the light intensity change desired. That is, the greater the selected $V_z$ is, the greater the light intensity needed to trigger the zener diodes. Once a diode conducts, the signal is then passed to the majority voting network 20 which functions in the manner previously described. Again the power circuitry for the comparison circuits 28 to 30 and network 20 have been omitted for purposes of simplicity.

The intensity change detection system 27 may be varied by replacing the comparison circuits 28 to 30 with rate of change comparison circuitry (not shown). This would allow the user to detect fires based on the rate of change of light intensity.

CONCLUSION

From the foregoing, it will be readily apparent that the present invention provides numerous advantages not found in prior art devices. For example, increased speed of response is available because the response time of the photodetectors and related circuitry is considerably less then the time required to burn through a "fleak" wire. And, the present invention may obviously be much more easily installed than "fleak" wire because all pipes, valves and other components of the oxidizer piping system must be wrapped completely with the "fleak" wires. Also, the "fleak" wire system must be reworked or replaced whenever the oxidizer piping system is modified or subjected to routine maintenance whereas the present invention will not interfere with the accomplishment of oxidizer system change or maintenance. Further, reliability will be increased and false alarms will be eliminated due to the use of multiple redundancy and the majority voting system employed by the present invention. Finally, the photodetector system of the present invention can be located so that it is not likely that it will be destroyed by the incident it detects whereas destruction of at least part of the "fleak" wire system is inherent in its design.

Obviously many modifications and variations of the present invention are possible in the light of the above teachings and would readily occur to those skilled in the art. For example, many different photodetectors are available and selection of any one of them might change the associated circuitry. Also, it will be obvious that reliability might be increased to any level desired by increasing the number of photodetectors beyond the three described herein together with a corresponding increase in the majority voting network. It is therefore to be understood that within the scope of the appended claims the invention may be practiced otherwise than as specifically described.

What is claimed is:

1. A system for detecting fires resulting from the escape or burn through of oxidizer from a piping system for handling the same comprising:

a plurality of photodetectors, to be positioned adjacent the oxidizer piping system and responsive to the light resulting from an oxidizer fire, for producing output signals indicating the sensing of a fire; and a majority voting network for receiving the output signals from said photodetectors and for producing an output signal which may be used to initiate corrective action, said network producing an output only when a majority of said photodetectors simultaneously sense a fire.

2. The detector system defined in claim 1 wherein said majority voting network comprises:

a plurality of AND gates, each of said AND gates being electrically connected to a different majority of said photodetectors; and an OR gate electrically connected to all of said AND gates for producing an output signal whenever any of said AND gates conducts.

3. The detector system defined in claim 1 wherein an optical pass filter is interposed between said photodetectors and the oxidizer piping system, said optical pass filters being designed to pass the particular wavelength of light produced by a fire resulting from the oxidizer burning the metal of which the oxidizer piping system is composed.

4. The detector system defined in claim 1 wherein a comparison circuit is interposed between each photodetector and said majority voting network, each comparison circuit including a zener diode which does not begin conducting until the associated photodetector is sensing light of an intensity a predetermined amount greater than the ambient light level.

5. The detector system defined in claim 2 wherein an optical pass filter is interposed between said photodetectors and the oxidizer piping system, said optical pass filters being designed to pass the particular wavelength of light produced by a fire resulting from the oxidizer burning the metal of which the oxidizer piping system is composed.

6. The detector system defined in claim 2 wherein a comparison circuit is interposed between each photodetector and said majority voting network, each comparison circuit including a zener diode which does not begin conducting until the associated photodetector is sensing light of an intensity a predetermined amount greater than the ambient light level.

7. The detector system defined in claim 5 wherein the optical pass filter is designed to pass light resulting from a nickel-fluorine fire.

* * * * *